United States Patent Office 3,442,027
Patented May 6, 1969

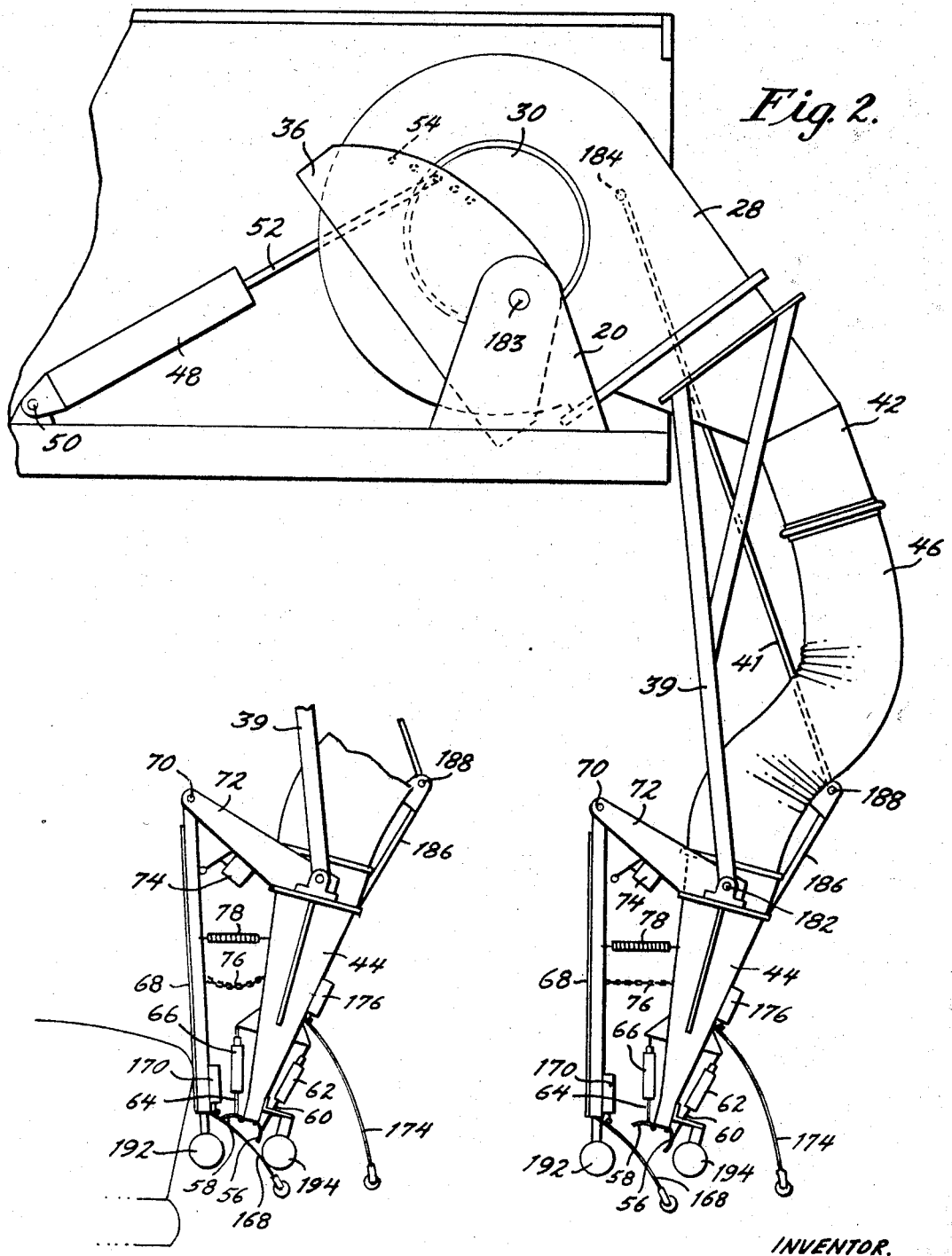

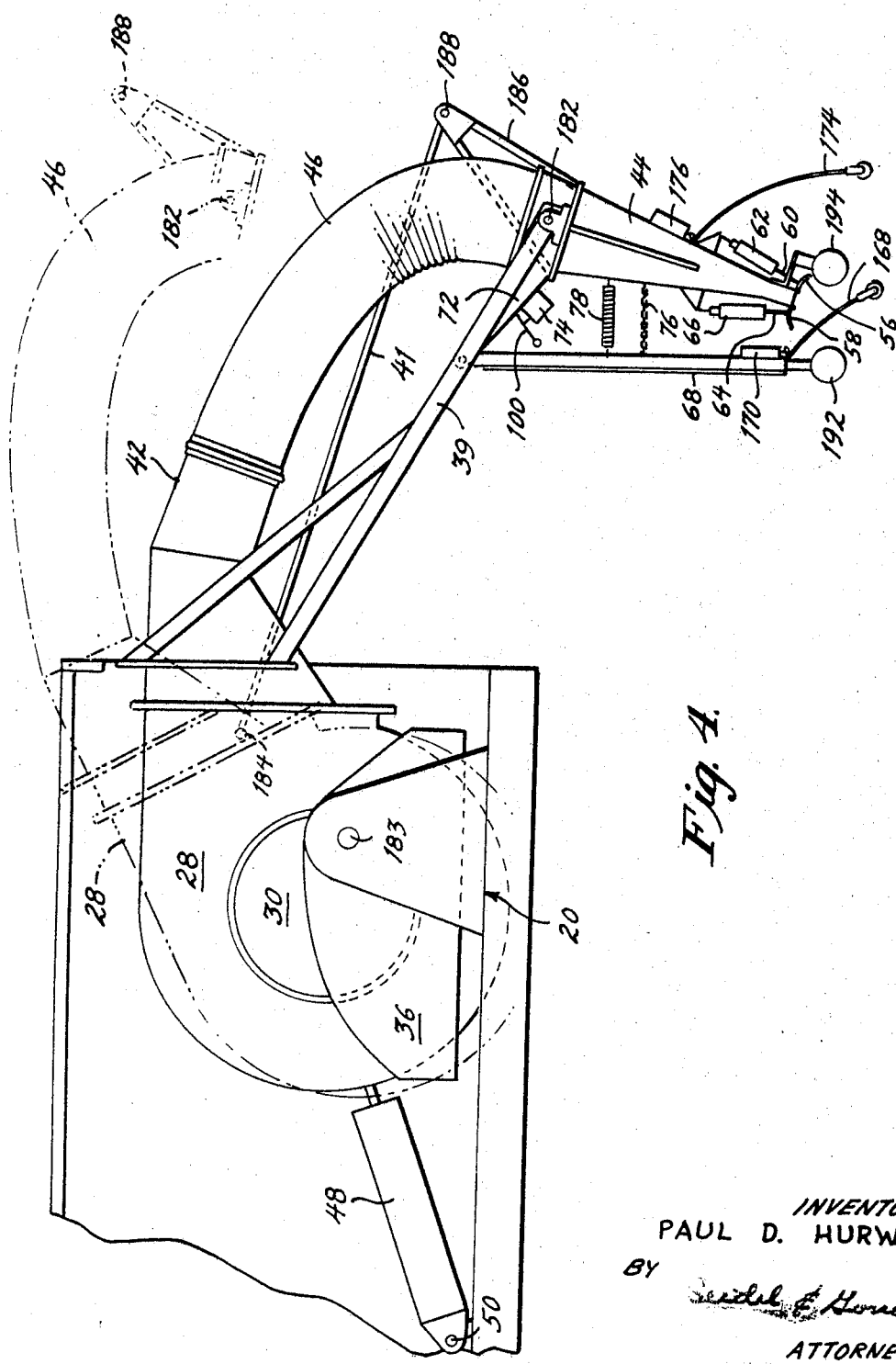

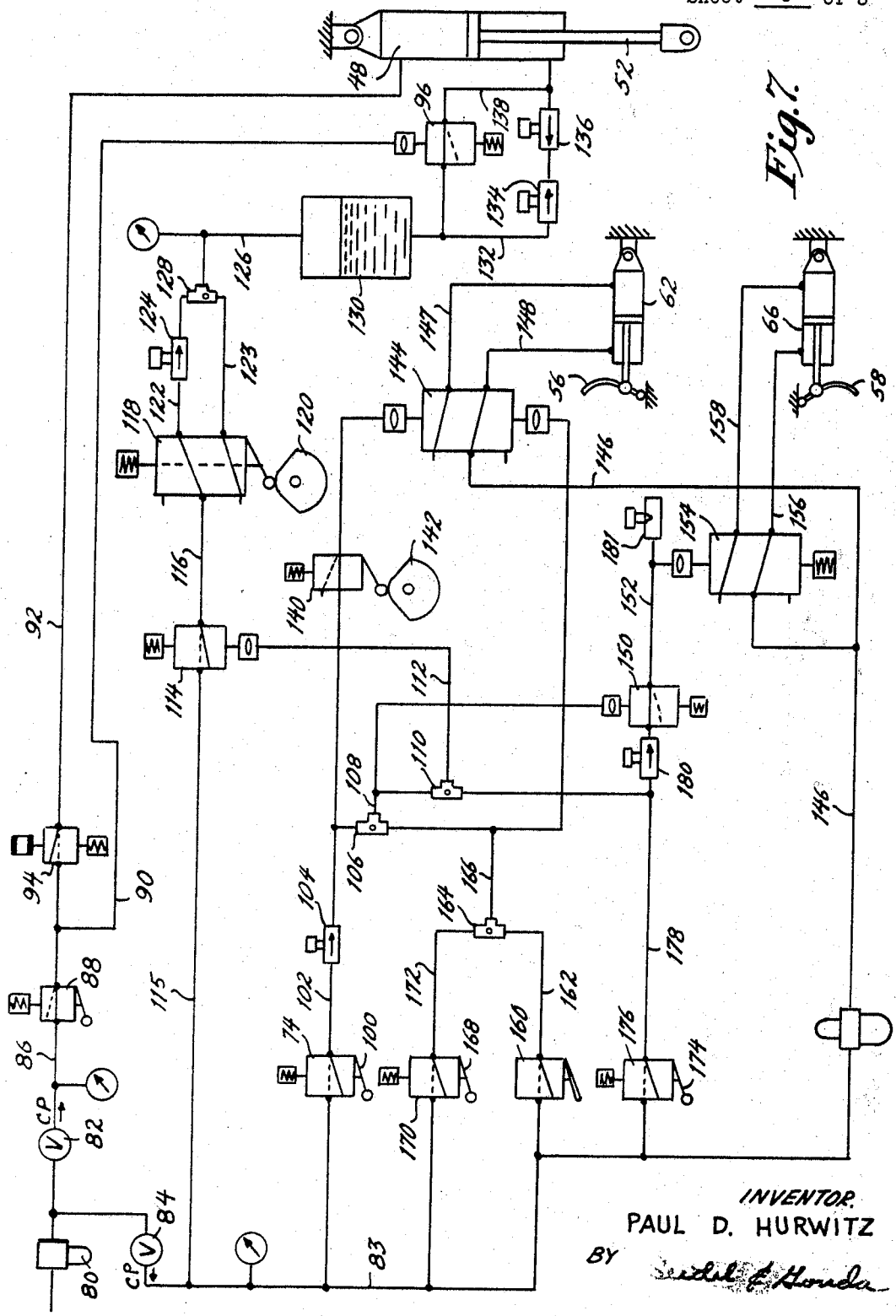

3,442,027
VEHICLE CONTOUR FOLLOWER BLOWER
Paul D. Hurwitz, Wyncote, Pa., assignor to Sherman Car Wash Equipment Co., Palmyra, N.J., a corporation of New Jersey
Filed July 6, 1967, Ser. No. 651,656
Int. Cl. F26b 21/00
U.S. Cl. 34—54      12 Claims

ABSTRACT OF THE DISCLOSURE

Vehicle drying apparatus is provided having a single contoured nozzle connected to a rotatable blower by a flexible conduit. Control means is provided to cause the nozzle to move up and down so as to follow the top contour of the vehicle while blowing a sheet of air at the vehicle to dry the vehicle.

---

Attempts have been made heretofore to design a follower blower for drying vehicles which have been washed. For example, see U.S. Patent 3,279,093. The arrangement in said patent has several basic disadvantages which are eliminated by the present invention. In said patent, a plurality of blowers are mounted on a frame. Control means are provided to cause the entire frame to move up and down as the top contour of the vehicle changes. In the present invention, I use only one blower which is separate from the nozzle so that only the nozzle follows the top contour of the vehicle. In this manner, the sensitivity and speed of response is substantially increased.

In said patent, there is provided four in line blowers. I use a single nozzle contoured to direct a sheet of air across the width of the front, top and rear of the vehicle. In addition, my nozzle is provied with deflectors which have positions enabling the sheet of air to be directed forwardly, rearwardly, and/or directly at the vehicle top with the nozzle at all times being generally upright. Hence, I can dry a vehicle more efficiently and effectively since I can direct the sheet of air at areas not covered by prior devices such as the grille area at the front of the vehicle or the bumper at the rear of the vehicle.

In said patent, the blower frame is balanced so as to weigh slightly more than counterweights connected to it. Hence, the blower frame in said patent is gravity biased to its lowermost position. In the present invention, my nozzle is counterbalanced to assume an uppermost position which is pneumatically balanced out in order to use the nozzle in a drying operation. If there is an electrical or pneumatic failure, my nozzle will automaticaly move upwardly out of the way of a vehicle.

It is an object of the present invention to provide a novel follower blower.

It is another object of the present invention to provide a novel follower blower having a minimum number of movable parts while being reliable and requiring minimum maintenance.

It is another object of the present invention to provide a novel follower blower having a single nozzle for directing a sheet of air at the front, top and rear of a vehicle to be dried.

It is another object of the present invention to provide a novel follower blower which will facilitate a movement of the nozzle along the contour of the vehicle as a result of pivotable movement of the blower.

It is another object of the present invention to provide a follower blower having a nozzle which is generally upright at all times while following the contour of a vehicle with the direction of air discharging from the nozzle being controlled by deflectors mounted on the nozzle.

For the purpose of illustrating the invention, there is shown in the drawings a form which is presently preferred; it being understood, however, that this invention is not limited to the precise arrangements and instrumentalities shown.

FIGURE 2 is a sectional view taken along the line 2—2 in FIGURE 1.

FIGURE 3 is an enlarged side view of the nozzle.

FIGURE 4 is a side elevation view with the nozzle in a partially elevated position.

FIGURE 5 is a top plan view of the blower support frame.

FIGURE 6 is a front elevation view of the blower support frame.

FIGURE 7 is a diagrammatic circuit diagram.

Figure 1:
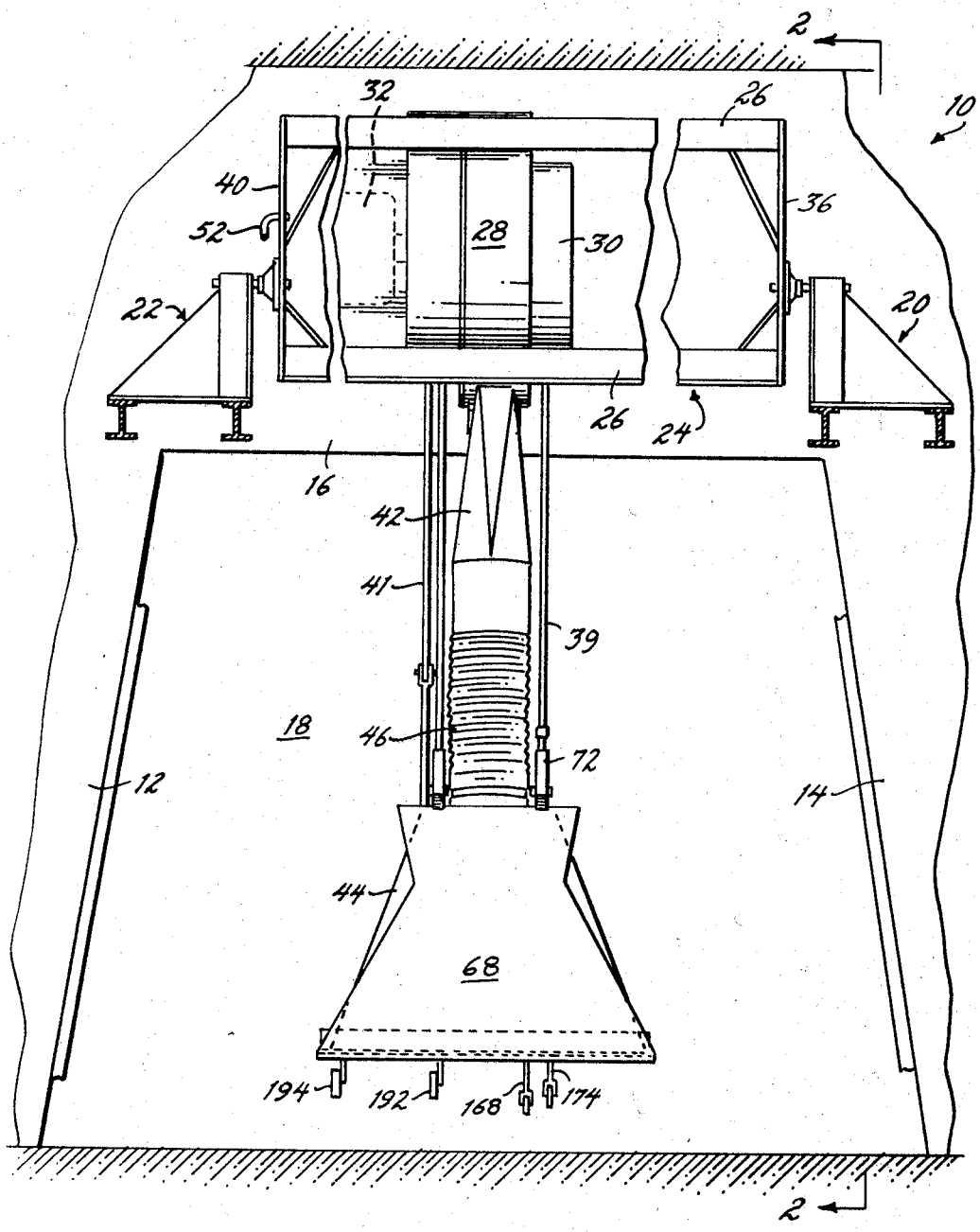
FIGURE 1 is an elevation view taken in the direction of movement of the vehicle to be dried.

Referring to the drawing in detail, wherein like numerals indicate like elements, there is shown in FIGURE 1 a blower follower in accordance with the present invention designated generally as 10. The blower follower 10 includes a generally inverted U-shaped housing having side portions 12 and 14 connected together at their upper ends by a top portion 16 so as to define a vehicle passage opening designated as 18.

The top portion 16 includes trunnion supports 20 and 22 supporting a blower means 24. The blower means 24 includes a blower support frame 26 on which is mounted a blower 28. Blower 28 has an inlet portion 30 coaxial with motor 32 and is balanced to assume the fully elevated position partially shown in phantom in FIGURE 4.

A trunnion 34 on end panel 36 of the frame 26 is rotatably supported by trunnion support 20. A trunnion 38 on end panel 40 of the frame 26 is rotatably supported by trunnion support 22. The entire blower means 24 is adapted to rotate about the longitudinal axis of the coaxial trunnions 34 and 38. The outlet portion 42 of the blower 28 communicates with nozzle 44 by means of an extensible conduit such as bellows 46. Parallelogram brackets 39 and 41 which support nozzle 44 from blower 28 and portion 16, respectively, will be referred to hereinafter.

A cylinder 48, see FIGURE 4, has one end pivotably connected to a pin 50 which is stationary on the top portion 16. A piston disposed within cylinder 48 is connected to one end of piston rod 52. The other end of piston rod 52 is pivotably connected to the end panel 40 by means of a pin extending through one of the holes 54. The provision of a plurality of holes 54 facilitates adjustment of the piston rod with respect to panel 40. As piston rod 52 is caused to move upwardly into the left in FIGURE 4, the entire blower means 24 will rotate in a counterclockwise direction about the axis of trunnions 34 and 38. This will be explained in greater detail hereinafter.

A pair of vanes or deflectors 56 and 58 are pivotably connected to the lower end of the nozzle 44 on opposite sides of the discharge opening. In the start position as shown in FIGURE 1, the discharge opening of nozzle 44 is about 18 inches off the floor. A piston rod 60 has one end pivotably connected to deflector 56. The other end of piston 60 extends into cylinder 62 and terminates at a piston therein. The upper end of cylinder 62 is pivotably connected to the bracket on the nozzle 44.

One end of piston rod 64 is pivotably connected to deflector 58. The other end of piston rod 64 extends into cylinder 66 and is connected to a piston therein. The upper end of cylinder 66 is pivotably connected to a bracket on the nozzle 44.

A feeler plate 68 is pivotably connected by pin 70 to a bracket arm 72 supported as a cantilever arm by the upper end of nozzle 44. A regulator 74 is supported by arm 72 and is actuated by plate 68 as it moves toward nozzle 4. Plate 68 has a padded surface which is adapted to be contacted by a portion of the vehicle to be dried. Plate 68 is connected to the nozzle 44 by a chain 76 so as to limit the extent of pivotable movement away from nozzle 44. Spring 78 biases plate 68 away from nozzle 44. The relationship between plate 68 and regulator 74 will be explained in greater detail hereinafter.

Referring particularly to the circuit diagram in FIGURE 7, air under an inlet pressure of approximately 125 pounds is introduced into the system by way of filter 80. All moisture and other impurities are removed from the air by said filter. The air is then introduced through outlet pressure regulator 82 to conduit 86 or pressure regulator 84 to conduit 83. Pressure regulator 82 is preferably set so as to reduce the presure down to about 50 p.s.i. Pressure regulator 84 is preferably set to reduce the pressure down to about 100 p.s.i. From pressure regulator 82, the air is conducted by way of conduit 86 to an emergency dump valve 88 which is a three-way normally open valve. From valve 88, the air flows through conduit 90 or conduit 92. Conduit 92 contains a solenoid operated valve 94 which is a three-way normally closed valve.

Conduit 92 communicates air at 50 p.s.i. to one end of cylinder 48 so long as valves 88 and 94 are open. Conduit 90 is connected to a pilot operated valve 96 which is a two-way normally open valve. As the blower 28 is turned on, either manually or by means of an actuator switch responsive to a vehicle, it automatically energizes valve 94 which permits air to be transmitted by way of conduit 92 to one end of cylinder 48. Introduction of air into cylinder 48 by way of conduit 92 causes the nozzle 44 to move downwardly and counteract the upward force caused by the discharge of air and the counterbalance.

As the grille of a vehicle strikes the feeler plate 68, plate 68 contacts detector 100 on regulator 74 and actuates the same. See FIGURE 3. Valve 74 is a miniature regulator which provides increasing output pressure in proportion to the amount of movement of the detector 100 by the plate 68. The output pressure of valve 74 is delivered by way of conduit 102, through flow control valve 104 to shuttle valve 106, through conduit 108, through shuttle valve 110, through conduit 112 to remote regulator 114. Regulator 114 is a remote operated regulator having its inlet connected to conduit 115 and produces an output pressure in conduit 116 equal to the pressure in conduit 112. Hence, regulator 114 is a slave to regulator 74.

Figures 5, 6:
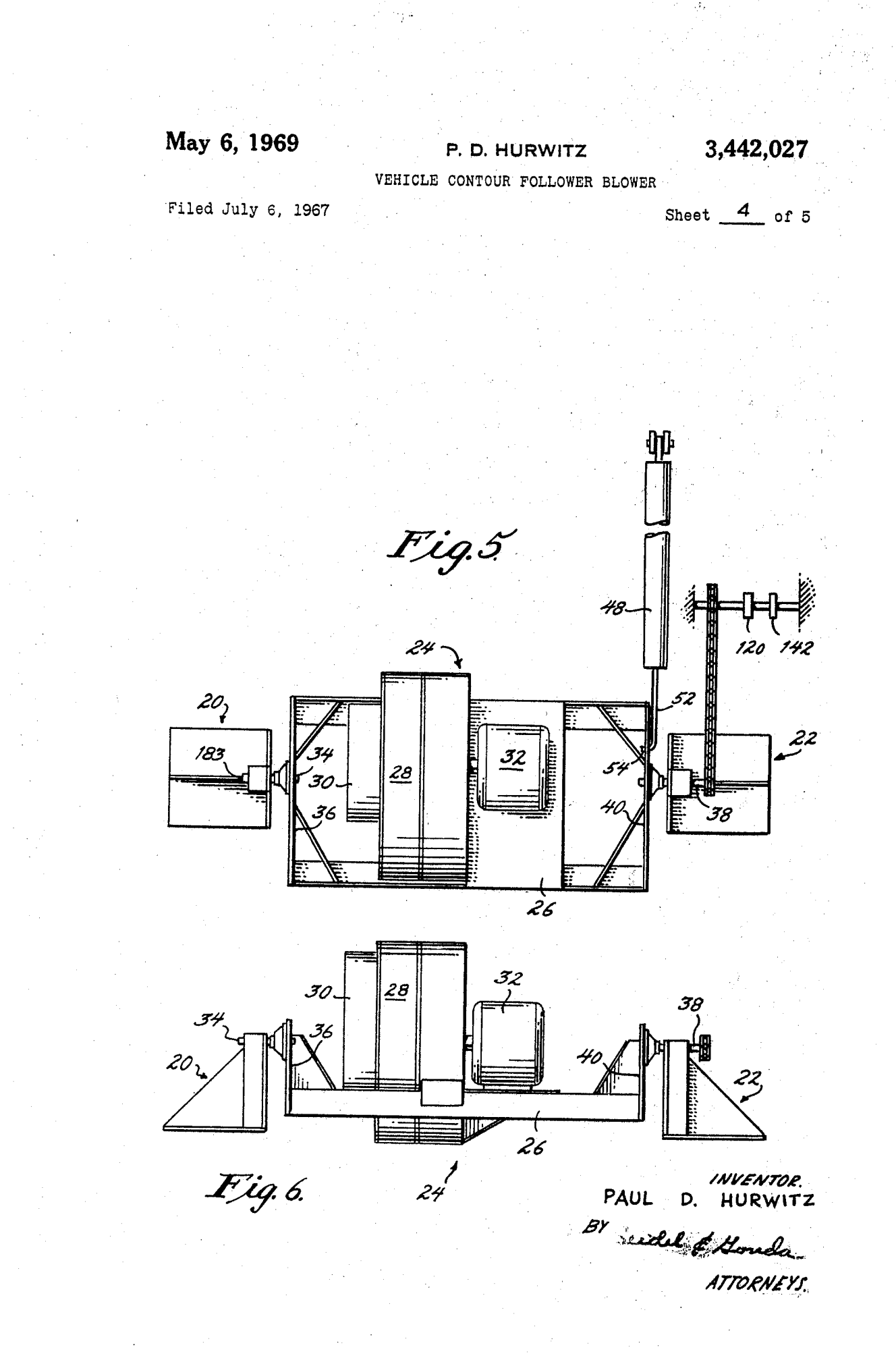

Conduit 116 delivers pressurized air to valve 118 which is a four-way valve spring biased to the position shown and operated by cam 120. Cam 120 rotates as the blower 28 rotates since it is on a cam shaft geared to trunnion 38, see FIGURE 5. The position of valve 118 is determined by the height of the nozzle 44 above the floor. The cam 120 is set so that the valve 118 moves from the position shown to its opposite position when the nozzle 44 is at a height of approximately 41 inches above the floor. This height may be varied as desired. In the position shown, pressure from conduit 116 is delivered to conduit 122 which contains a flow control valve 124.

From valve 124, pressurized air is delivered by way of shuttle valve 128 and conduit 126 to the space above the oil in reservoir 130. The pressure in conduit 126 is determined by the deflection of the detector 100 on regulator 74 so that as plate 68 strikes the grille of a vehicle, the pressure in reservoir 130 will increase as the amount of deflection increases. As the pressure reservoir 130 increases, oil is forced through conduit 132 containing flow control valves 134 and 136. As the oil leaves the reservoir 130, it flows freely through valve 134 but is restricted by the setting of valve 136. The oil is then delivered to the lower end of cylinder 48 and is of sufficient pressure so as to cause the nozzle 44 to rise.

As the nozzle 44 rises, the plate 68 is moved away from the grille of the vehicle and thus reduces the deflection of detector 100 on regulator 74. This reduces the pressure in conduit 102 and via the system described above, the pressure in conduit 126. This reduction in pressure reduces the pressure on the piston connected to piston rod 52 and eventually causes the cylinder 48 and piston rod 42 to seek a balance point. As the vehicle continues forward, it again strikes the plate 68 and actuates regulator 74 and the cycle is repeated.

The valve 140 operated by cam 142 is a three-way valve which is normally open. Valve 140 is adjusted to operate when the nozzle 44 reaches a height of approximately 33 inches above ground level which approximates the hood level of the vehicle. In the position shown in FIGURE 3, the nozzle 44 is less than 33 inches off the ground. Therefore, pressure in conduit 102 is transmitted through valve 140 to the double air-operated pilot valve 144. Valve 44 is a four-way valve.

The pressure transmitted to valve 144 actuates the same so that pressure from conduit 146 is transmitted to conduit 147 while conduit 148 is exhausted to the atmosphere. This causes the piston rod of cylinder 62 to extend thereby deflecting the vane 56 so as to direct a blast of air into the grille area of the vehicle. Valve 144 will remain in that position until opposite pilot pressure is applied from conduit 166 to return it to the illustrated position as will be explained hereinafter. Vane 56 likewise will remain in the actuated position until conduit 147 is vented to atmosphere.

As the nozzle 44 continues its upward movement through the actuation of regulator 74 by plate 68, it eventually causes pilot regulator 170 to become actuated by contact with the hood of the vehicle. Regulator 170 is supported by the plate 68 and is provided with a feeler or detector 168. Regulator 170 is a regulator identical to regulator 74 in that its output pressure in conduit 172 is determined by the position of the detector 168. Pressure from regulator 170 is transmitted by way of conduit 172 to shuttle valve 164 and via conduit 166 to shuttle valve 106. Valve 106 directs the pressure by way of conduit 108 to shuttle valve 110 and then by way of conduit 112 to regulator 114 which delivers variable pressure by way of conduit 116 to valve 118. Valve 118, at this time, has been cam actuated to a position opposite to that shown in the drawing. Thus, pressure from regulator 114 is directed by way of conduit 116 to conduit 123 to shuttle valve 128 and then by way of conduit 126 to the reservoir 130.

Thus, regualtor 170 will take over control of the nozzle 44 from regulator 74. However, in addition to controlling the position of the nozzle 44 by way of cylinder 48, regulator 170 also transmits pressure by way of conduit 166 to the valve 144. This now acts to move the control position of valve 144 to that shown in the drawing, whereby air is exhausted from conduit 147 and pressurized air is delivered through conduit 148 to the cylinder 62. This causes the piston rod of cylinder 62 to retract, thereby moving the vane 56 to its normal position wherein it will remain until reactivated.

Vane 58 remains in its normal position when either regualtor 74 or 170 have been activated to introduce air into conduit 108. Pressurized air in conduit 108 is delivered to three-way normally spring biased open valve 150 which closes the same and causes the air from conduit 152 to exhaust to atmosphere. This in turn enables valve 154 to be spring biased to the position shown in the drawing, thereby exhausting the pressure from conduit 158 and introducing pressure from conduit 83 into conduit 156. This in turn will actuate the piston rod of cylinder 66 and cause the vane 58 to remain in its normal position.

If it is desired to raise the nozzle 44 for any reason, a manually operable valve 160 is provided in conduit 162 between the inlet conduit 83 and conduit 166. When manual valve 160 is actuated, pressurized air is introduced into conduit 162, through valve 164, through conduit 166, through valve 106, through conduit 108, through valve 110, through conduit 112, to regulator 114. Air can now flow from conduit 115 through regulator 114, through conduit 116, through valve 118, through conduit 126 to the reservoir 130 at a pressure corresponding to the extent valve 160 has been actuated. The introduction of pressurized air into reservoir 130 raises the nozzle 44.

As the nozzle 44 traverses the hood of the vehicle and contacts the windshield, the plate 68 is again actuated which in turn actuates regulator valve 74. As described above, regulator valve 74 delivers variable pressure to conduit 102 which in turn is in communication with reservoir 130 as described above. However, valve 140 has now been cam operated to its up position shown in phanton, and pressure from conduit 102 no longer communicates with valve 144. Hence, cylinder 62 will not extend the vane 56 as the nozzle progresses up the windshield to the roof of the vehicle. As the nozzle 44 progresses up the windshield, all water thereon is blown up the windshield to the roof of the vehicle without actuating vane 56.

As the nozzle 44 traverses the roof of the vehicle and approaches the rear window, the detector 168 of the regulator 170 will fall free off the back of the top of the vehicle. This results in regulator 170 closing, thereby isolating conduit 83 from conduit 172. The lack of pressure in conduit 172 will cause the nozzle 44 to descend as described above. As the nozzle 44 descends the detector 174 on regulator 176 will strike the top of the vehicle, thus opening regulator 176. As a result thereof, conduit 178 is in communication with conduit 83. Pressure in line 178 will depend upon the extent to which the detector 174 is actuated. The descent of the nozzle 44 will cease since conduit 178 will now be in communication with the conduit 112 for operating regulator 114 which pressurizes reservoir 130 from which a balancing pressure is introduced into the cylinder 48. This will maintain the nozzle 44 at the proper level.

In addition to delivering pressurized air to conduct 112 via conduit 178 and the shuttle valve 110, the pressurized air from conduit 178 also is transmitted to flow control valve 180 and to the pilot operated valve 150 which is a three-way normally open valve. In the illustrated position of valve 150, pressurized air will be delivered to valve 154 by way of conduit 152. This causes valve 154 to be actuated from the position shown to a position which permits introducing pressure into conduit 158 and exhausting pressure from conduit 156. As a result thereof, cylinder 66 will be actuated to cause the vane 58 to be deflected so as to direct the sheet of air from nozzle 44 at an angle of incidence of approximately −5° against the surface of the rear window on the vehicle to blow any water onto the rear deck.

As the vehicle continues forward, the detector 174 for regulator 176 will fall free of the vehicle, thus allowing pressure to slowly escape from conduit 152 and be restricted by needle bleed valve 181. This causes a delay in the return of the piston in cylinder 66 to its normal position. As the nozzle 44 lowers to the rear deck of the vehicle, said deck energizes the detector 168 on regulator 170 which in turn controls the location of the piston in cylinder 48 to stop descent of the nozzle. Actuation of regulator 170 also results in pressurized air in conduit 108 which is directed to valve 150, thereby causing pressure from conduit 152 to exhaust to the atmosphere. This results in a deenergization of the pilot on valve 154 which in turn enables a spring to cause it to shift to the position shown. In the position shown for valve 154, pressure from conduit 158 is exhausted to atmosphere and pressurized air is introduced into conduit 156. Accordingly, the rear vane 58 assumes its normal position.

At this point, cam 120 associated with valve 118 has resumed its down position. Reservoir 130 is now controlled by the pilot regulator 170. Shuttle valve 128 automatically is set to permit passage of air from conduit 122 to conduit 126. As the nozzle 44 traverses the rear deck of the vehicle, the detector 68 on regulator 170 will fall free as it passes the rear of the vehicle. The detector 174 on regulator 176 still contacts the rear deck and will thereafter resume control of the position of the nozzle 44. Also, due to the pressure in conduit 152 acting on valve 154, pressurized air will be introduced by way of conduit 158 to the cylinder 66 to cause the vane 58 to be deflected so as to direct a sheet of air against the rear of the vehicle.

As the detector 174 falls free of the rear deck of the vehicle, movement of the piston rod in cylinder 66 is again delayed in returning to its normal position because of the restriction of flow control valve 180. However, in this case, valve 118 is in the position shown. Hence, pressurized air is escaping from the reservoir 130 by way of conduits 126 and 122. Such escaping pressurized air is restricted as it passes through the valve 124. This causes the nozzle 44 to "hang up" for a few seconds as the vehicle passes by, thereby permitting the air blast to strike the rear vertical surface of the vehicle for a few seconds longer. When the nozzle 44 resumes its lowermost position, it is positioned for actuation by the next vehicle whereby the above sequence will be repeated.

From the above, it will be apparent that conduit 152 is vented to atmosphere if there is pressure in conduit 108. Hence, if regulator 74 is actuated while vane 58 is in a deflected position, the vane immediately resumes its normal position. Such a situation could occur if a vehicle following too closely engages plate 68 while air is being directed by vane 58 at the rear of the preceding vehicle. It will be apparent that the normal position of the vanes is the inoperative position shown in FIGURE 4.

The piston rod 52 has a stroke which is sufficient to rotate the blower 28 through an arc of about 75° about an axis 183 corresponding to the axis of trunnions 34 and 38. The nozzle 44 is maintained upright with an angle of incidence of approximately 15° from the vertical by the parallellogram brackets 39 and 41. Bracket 39 is fixed to blower 28 for rotation about axis 183 and is pivotably connected to nozzle 44 at 182. Bracket 41 is pivotably connected to portion 16 at 184 and pivotably connected to arm 186 at 188. The distance from 182 to 188 is always equal to the distance from 183 to 184.

If regulator 74 is not activated by plate 68, or some other malfunction occurs so that nozzle 44 does not rise up out of the way of a vehicle, plate 68 actuates dump valve 88 at the end of its pivotal movement. Valve 88 vents conduits 90 and 92 to atmosphere. When conduit 90 is vented, valve 96 is spring biased to the position shown so that oil may be rapidly introduced into cylinder 48 to prevent creation of a partial vacuum while the nozzle moves upwardly due to the counterbalance of the blower 28.

When regulator 74 and 170 are simultaneously activated the one having the highest output pressure, which is dependent on the extent of activation, controls the position of nozzle 44. Arrows have been applied to the flow control valves to indicate the direction of unrestricted flow.

Valve 118 is cam operated so that different control effects are achieved on nozzle 44. When the nozzle 44 passes off the rear deck, a few seconds delay is desired so that vane 58 may direct air at the rear of the vehicle. This delay is achieved by valve 124. When the nozzle 44 clears the roof of the vehicle, it is desired to have the nozzle descend directly to the rear deck. This comparatively rapid descent is achieved by venting conduit 123 which does not contain a restriction.

It will be apparent that the pneumatic circuit described above and shown in FIGURE 7 could be hydraulic or electrical. Instead of using vanes for deflecting air discharged from nozzle 44, the purpose of the vanes could be accomplished by changing the angle of incidence of nozzle 44 with respect to the vertical. Alternatively, a flexible tip portion on the nozzle could be flexed to change the direction of discharge from nozzle 44. Other equivalent devices will suggest themselves to those skilled in the art. Hereinafter, plate 68, detector 168 and detector 174 may be referred to as a feeler means. Little wheels may be provided at the lower end of detectors 168 and 174. Likewise, a wheel 192 may be provided on the lower end of plate 68 and a similar wheel 194 on nozzle 44.

Nozzle 44 has a diverging discharge flow pattern since in plan view it is widest at its discharge part, see FIGURE 1. However, nozzle 44 has a uniform cross-sectional area so that air flow therethrough has a uniform velocity. Thus, nozzle 44 tapers toward its discharge port when viewed in elevation, see FIGURE 3.

I claim:

1. A follower blower for drying vehicles comprising a generally upright nozzle for discharging a sheet of air downwardly at a vehicle, a conduit connecting said nozzle to the outlet of a blower, means for selectively changing the flow path of air discharged from the nozzle, means supporting said nozzle to maintain the previously selected flow path constant at any altitude of the nozzle, feeler means adjacent the nozzle and adapted to be contacted by a vehicle, and a circuit coupled to said feeler means for causing said nozzle to move up and down and follow a vehicle contour in response to contact of a portion of the feeler means with a vehicle so that air is discharged in a downward direction at generally horizontal portions of the vehicle contour and is selectively directed in at least one other direction toward transverse upright portions of the vehicle contour.

2. A follower blower in accordance with claim 1 wherein said flow path changing means includes vanes on the nozzle, said feeler means including a detector supported by said nozzle, for initiating actuation of one vane to deflect discharged air in one direction and a second detector supported by said nozzle for initiating actuation of another vane to deflect discharged air in another direction.

3. A follower blower in accordance with claim 1 wherein said circuit includes a remote pneumatic pressure regulator controlling means to raise and lower said nozzle, a pilot regulator controlling said remote regulator, and said pilot regulator being operable proportional to the amount of movement of said feeler means due to contact with the vehicle.

4. In a vehicle drying apparatus comprising an upright nozzle having a generally rectangular discharge opening, the length of said opening being at least ten times its width for discharging a sheet of air, said discharge opening being at the lower end of said nozzle, a first deflector van pivoted to said nozzle and extending along substantially the entire length of one major side of said opening, a second deflector vane pivoted to said nozzle and extending along substantially the length of the other major side of said opening, and selectively operable power devices for moving said deflectors to operative positions so that the direction of discharge from said nozzle may be varied in generally opposite directions against upright surfaces.

5. In apparatus in accordance with claim 4 including a blower connected to the nozzle by a flexible conduit, and a parallelogram linkage between the nozzle and the blower and a stationary support for maintaining a substantially constant angle of incidence for air discharging from the nozzle at various heights of the nozzle relative to a floor.

6. A follower blower for drying vehicles comprising a generally upright nozzle for discharging a sheet of air at a vehicle, a conduit connecting said nozzle to the outlet of a blower feeler means adjacent the nozzle and adapted to be contacted by a vehicle, a circuit coupled to said feeler means for causing said nozzle to follow a vehicle contour in response to contact of a portion of the feeler means with the vehicle, said nozzle having a cross section which widens in the direction of movement of air through the nozzle so as to have a diverging discharge flow pattern, means for changing the angle of incidence of discharge from the nozzle for directing air at upright surfaces on a vehicle, said last-mentioned means including a vane pivotably mounted on one side of the nozzle outlet opening adjacent thereto, a second vane on the other side of the opening adjacent thereto, and power devices for moving said vanes through an angle of at least about 120° so that they deflect air discharged from the nozzle.

7. A follower blower in accordance with claim 6 wherein said blower and its motor are supported on a frame mounted for pivotable movement about a horizontal axis, said horizontal axis being above a passageway for the vehicle and perpendicular to the direction of movement of the vehicle, and rigid bracket members coupling said nozzle to said blower so that the nozzle raises and lowers as the blower is rotated about said axis, and means coupled to said circuit and blower for rotating the blower to effect raising and lowering of the nozzle.

8. A follower blower for drying vehicles comprising a generally upright nozzle for discharging a sheet of air at a vehicle, a conduit connecting said nozzle to the outlet of a blower, feeler means adjacent the nozzle and adapted to be contacted by a vehicle, said feeler means including a plate-like member and a secondary feeler supported by said member and depending therefrom, a circuit coupled to said feeler means for causing said nozzle to follow a vehicle contour in response to contact of a portion of a feeler means with the vehicle, and said secondary feeler being coupled to said circuit for controlling movement of said nozzle.

9. In apparatus in accordance with claim 8 wherein said circuit includes a remote regulator for controlling the vertical disposition of the nozzle in direct relation to the extent of actuation of said feeler means.

10. A follower blower for drying vehicles comprising a generally upright nozzle for discharging a sheet of air at a vehicle, a conduit connecting said nozzle to the outlet of a blower, feeler means adjacent the nozzle and adapted to be contacted by a vehicle, a circuit coupled to said feeler means for causing said nozzle to follow a vehicle contour in response to contact of a portion of the feeler means with a vehicle, said circuit including a remote regulator for controlling the vertical disposition of the nozzle in direct relation to the extent of actuation of said feeler means, a plate-like feeler device supported by the nozzle and disposed alongside the nozzle, said device supporting a secondary feeler which depends therefrom, and a circuit coupled to said device and feeler for selectively controlling a raising and lowering of the nozzle, said last-mentioned circuit including a regulator operated by said device.

11. A follower blower for drying vehicles comprising a generally upright nozzle for discharging a sheet of air at a vehicle, a conduit connecting said nozzle to the outlet of a blower, feeler means adjacent the nozzle and adapted to be contacted by a vehicle, a circuit coupled to said feeler means for causing said nozzle to follow a vehicle contour in response to contact of a portion of the feeler means with a vehicle, said nozzle being counterbalanced to an uppermost position, and means for causing said nozzle to assume a lowermost position in response to starting the blower.

12. In apparatus in accordance with claim 11 including means for changing the flow path of discharged air from the nozzle for directing the air at upright surfaces on a vehicle, said last-mentioned means including a vane pivotably mounted on one side of the nozzle outlet opening adjacent thereto, a second vane on the other side of the opening adjacent thereto, and power devices for moving the vanes through an angle so as to deflect air discharged from the nozzle at an angle of incidence of approximately 10 to 15 degrees with respect to the vertical.

References Cited

UNITED STATES PATENTS

| 1,230,458 | 6/1917 | Bouery | 239—511 |
| 3,224,108 | 12/1965 | Flaming | 34—229 XR |
| 3,279,093 | 10/1966 | Dutton | 34—229 |

FOREIGN PATENTS

| 1,023,105 | 3/1966 | Great Britain. |

CARLTON R. CROYLE, *Primary Examiner.*

ALLAN D. HERRMANN, *Assistant Examiner.*

U.S. Cl. X.R.

15—405; 34—229; 239—507